(12) United States Patent
Rao et al.

(10) Patent No.: US 9,294,211 B2
(45) Date of Patent: Mar. 22, 2016

(54) METHOD AND SYSTEM TO ENHANCE MANAGEMENT CHANNELS

(75) Inventors: Srinivas Rao, Bangalore (IN); Gajendra Singh Ranka, Bangalore (IN)

(73) Assignee: TEJAS NETWORKS LTD, Bangalore (IN)

( * ) Notice: Subject to any disclaimer, the term of this patent is extended or adjusted under 35 U.S.C. 154(b) by 157 days.

(21) Appl. No.: 14/008,553

(22) PCT Filed: Jul. 7, 2011

(86) PCT No.: PCT/IB2011/053013
§ 371 (c)(1),
(2), (4) Date: Sep. 29, 2013

(87) PCT Pub. No.: WO2012/131444
PCT Pub. Date: Oct. 4, 2012

(65) Prior Publication Data
US 2014/0064302 A1  Mar. 6, 2014

(30) Foreign Application Priority Data
Mar. 30, 2011  (IN) .......................... 1028/CHE/2011

(51) Int. Cl.
*H04J 3/02* (2006.01)
*H04J 3/04* (2006.01)
*H04J 3/14* (2006.01)
*H04J 3/06* (2006.01)

(52) U.S. Cl.
CPC ...... *H04J 3/02* (2013.01); *H04J 3/04* (2013.01); *H04J 3/14* (2013.01); *H04J 3/0691* (2013.01); *H04J 2203/0057* (2013.01); *H04J 2203/0089* (2013.01)

(58) Field of Classification Search
None
See application file for complete search history.

(56) References Cited

U.S. PATENT DOCUMENTS

| | | | |
|---|---|---|---|
| 2001/0046239 A1* | 11/2001 | Colombo et al. | 370/474 |
| 2003/0012184 A1* | 1/2003 | Walker et al. | 370/352 |
| 2003/0081596 A1* | 5/2003 | Kikidis et al. | 370/356 |
| 2003/0120799 A1* | 6/2003 | Lahav et al. | 709/236 |
| 2004/0013137 A1 | 1/2004 | Lohr | |
| 2004/0136389 A1* | 7/2004 | Hunneyball | 370/406 |
| 2009/0274168 A1 | 11/2009 | Glickman et al. | |
| 2012/0106956 A1* | 5/2012 | Rao et al. | 398/52 |
| 2013/0010811 A1* | 1/2013 | Hirose et al. | 370/498 |

* cited by examiner

*Primary Examiner* — Dang Ton
*Assistant Examiner* — Ronald H Davis
(74) *Attorney, Agent, or Firm* — Deborah Gador

(57) ABSTRACT

Embodiments of the disclosure relate to a method and system for enhancing management channels. The method comprises operating TDM (Time Division Multiplex) clock frequency at a predefined rate higher than operating frequency based on available management channels. Transmitting data on the management channels using the TDM slots of a TDM based controller at a higher frequency rate.

10 Claims, 2 Drawing Sheets

US 9,294,211 B2

METHOD AND SYSTEM TO ENHANCE MANAGEMENT CHANNELS

CROSS-REFERENCE TO RELATED APPLICATIONS

The present application claims priority to Indian patent application serial number 1028/CHE/2011 filed on Mar. 30, 2011, and claims the benefit of international application PCT/IB2011/053013 filed Jul. 7, 2011, the entire contents of which are incorporated by reference.

FIELD OF INVENTION

The present disclosure relates to management channels in a network and more particularly relates to enhancing management channels in a network.

BACKGROUND OF THE INVENTION

In SONET/SDH systems, management channels DCCR/DCCM is used as IBC i.e. in band communication channels. Similarly, the management channels are GCC channels for OTN (optical transport networks) systems. These management channels are typically HDLC based and any proprietary protocol can be run over HDLC. Management channels that are based on other packet technology (Ethernet, IP, etc.) are also capable of running proprietary protocols, however not very common. In any SONET/SDH based system, the typical requirement will be to support at least one DCCR/DCCM per optical port for IBC.

SONET/SDH systems consist of more than 150 optical ports are not uncommon. To support one DCCR, 3 slots are needed in HDLC controller along with super channeling support to make HDLC controller to treat all these 3 time slots as single HDLC controller channel. To support 150 such DCCR channels, 450 slots are needed in TDM based HDLC controller.

FIG. 1A shows the timing diagram of mapping DCCR channel into TDM slots. Each DCCR contains 3 bytes of 64 kbps data each. One byte of DCCR occupies 1 TDM slot, thus 3 TDM slots are required to support one DCCR channel. To support 150 such DCCR channels we require 450 time slots.

TDM based HDLC controllers with more than 450 slots are not cost effective. Some of the processors come with inbuilt HDLC controllers and we may need to migrate to higher end processor or use another dedicated HDLC controller for just to support more no of DCCR/DCCM channels, which is not a cost effective solution. FIG. 2A shows the prior art system block, for mapping management channels into TDM slots.

Figure 1A:
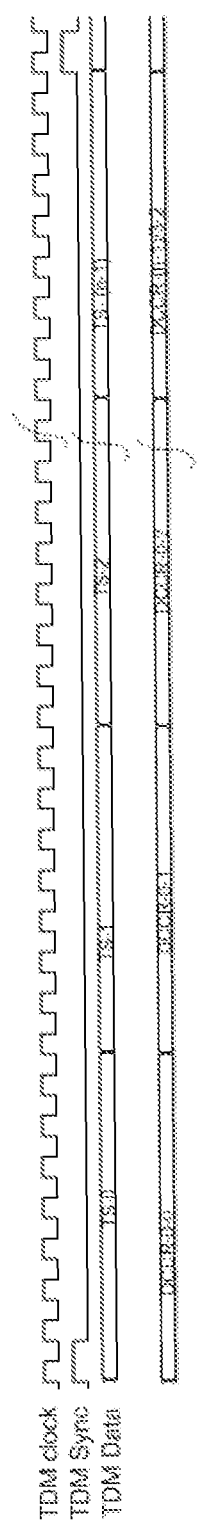
FIG. 1A illustrates Prior Art timing diagram of mapping management channels into TDM slots.

The figures depict embodiments of the disclosure for purposes of illustration only. One skilled in the art will readily recognize from the following description that alternative embodiments of the structures and methods illustrated herein may be employed without departing from the principles of the disclosure described herein.

DETAILED DESCRIPTION

The foregoing has broadly outlined the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures for carrying out the same purposes of the present disclosure. It should also be realized by those skilled in the art that such equivalent constructions do not depart from the spirit and scope of the disclosure as set forth in the appended claims. The novel features which are believed to be characteristic of the disclosure, both as to its organization and method of operation, together with further objects and advantages will be better understood from the following description when considered in connection with the accompanying figures. It is to be expressly understood, however, that each of Figures is provided for the purpose of illustration and description only and is not intended as a definition of the limits of the present disclosure.

Exemplary embodiments of the present disclosure provide a method and a system for enhancing management channels using TDM slots.

The shortcomings of the prior art are overcome and additional advantages are provided through the provision of a method and system as described in the description.

The primary embodiment of the present invention is a method of enhancing management channels comprising operating TDM (Time Division Multiplex) clock frequency at a predefined rate higher than operating frequency based on available management channels and transmitting data on the management channels using the TDM slots at a predefined higher frequency rate.

In yet another embodiment of the present invention, the TDM slots use at least one TDM bus to send the data on to the management channels.

In still another embodiment of the present invention, the TDM buses are at least one in number.

In still another embodiment of the present invention, the management channels are DCCR/DCCM (Data Communication Channel Regenerator/Data Communication Channel Multiplex) channels for SDH (Synchronous Digital Hierarchy) or SONET (Synchronous Optical Network); and GCC (General Communication Channel) channels for OTN (Optical Transport Network).

In still another embodiment of the present invention, the TDM clock frequency is increased by 3 times for DCCR; 9 times for DCCM; 2 times for GCC0, GCC1 and GCC2; and 4 times for combination of GCC1 and GCC2.

In still another embodiment of the present invention, the management channels are processed by TDM based processors selected from a group comprising of TDM based HDLC controllers, TDM based PPPoE controllers, and TDM based packet controllers.

Another embodiment of the present invention is a system to enhance management channels comprising of a controller consists of predefined number of TDM slots, at least one TDM bus to transmit data via TDM slots and control unit to control transmission of data on management channels. Also, the system consists of a means for selecting TDM slots available in controller for transmitting data on the management channels. Further, the system consists of a rate adapter block to operate TDM clock at a predefined rate higher than operating frequency based on management channel to transmit data.

In yet another embodiment of the present invention, the TDM buses are at least one in number.

In still another embodiment of the present invention, the TDM slots use at least one TDM bus to send the data on to the management channels.

In an exemplary embodiment, a method to implement no of DCCR/DCCM channels equal to no of TDM slots available in TDM based controllers. The controllers are selected from a at least one of TDM based HDLC controllers, TDM based PPPoE controllers and TDM based packet controllers. Using the method, number of management channels i.e. DCCR/DCCM channels or GCC channels are enhanced. The numbers by which the management channels are enhanced are 3 times for DCCR, 9 times for DCCM, 2 times for GCC0, GCC1 and GCC2 and 4 times for the combination of GCC1 and GCC2.

The TDM clock frequency is increased to 3 times for DCCR; 9 times for DCCM; 2 times for GCC0, GCC1 and GCC2; and 4 times for the combination of GCC1 and GCC2. The TDM sync signal is repeated based on the channels used, i.e. 3 times in a given time frame for DCCR channels.

The following is an example to illustrate DCCR channel implementation in TDM and DCCM implementation is similar to DCCR implementation.

Figure 1B:
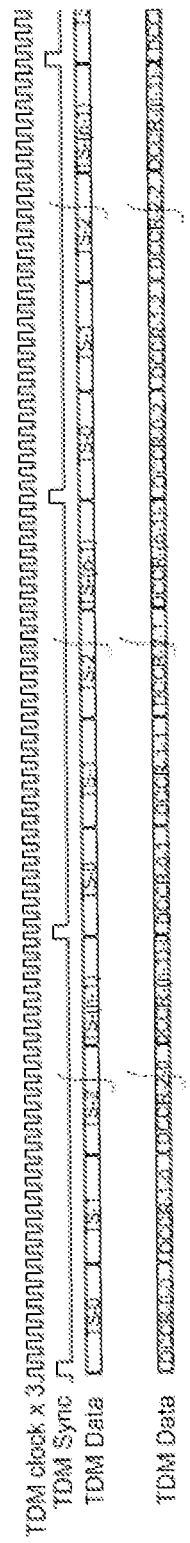
FIG. 1B illustrates timing diagram of mapping management channels into TDM slots and packing more number of management channels.

As shown in the FIG. 1B, at the arrival of first TDM sync signal, the first byte information to be transmitted from all n DCCR channels is placed in the TDM bus. On the $2^{nd}$ Sync arrival, the $2^{nd}$ byte of the all n DCCR channels is placed in the TDM bus. On the $3^{rd}$ Sync arrival, the $3^{rd}$ bytes of the all n DCCR channels are placed in the TDM bus. Within 1 actual frame time, 3 frames are processed using the method of present disclosure, thereby achieving 3 times bandwidth compared to the prior art.

In another embodiment, the controller i.e. HDLC controller is selected with lesser no of HDLC channel to support the methodology of this disclosure and thus reducing the solution cost for a given HDLC controller. Further, using this technique or methodology the implementation of more no of DCCR/DCCM channels for the given TDM slots is possible.

FIG. 1B illustrate the timing diagram of DCCR/DCCM channel implementation i.e. packing more number of channels using TDM based HDLC controller, in one embodiment. At the arrival of first TDM sync signal, the first byte information to be transmitted from all the DCCR channels is placed in the TDM bus, the DCCR channels are represented in the format DCCR-X-Y, where X represents DCCR channel number; Y represents DCCR byte number within DCCR channel which range in between 0 and 2.

Further, the last DCCR channel is represented as DCCR-(n−1)-0 during first TDM sync signal, where n represents the number of TDM slots supported by the controller, i.e. TDM based HDLC controller. Suppose the TDM based HDLC controller supports 32 time slots the value of n is restricted to 30 for DCCR and 27 for DCCM in the prior art as shown in FIG. 1A i.e. divisible by 3 for DCCR and 9 for DCCM, where as in the FIG. 1B, n is equal to number of channels supported by TDM based HDLC controller i.e. 32 for both DCCR and DCCM Each SONET/SDH frame repeats for every 125 μsec and each frame contains 3*64 kbps DCCR channels, 9*64 kbps DCCM channels and 1*64 kbps E1 channel, 1*64 kbps F1 channel. TDM based HDLC controller's supports multiple TDM buses but the number of TDM slots do not vary.

Further, the method provides operating different TDM buses at different rates and transmits the data using the combination of DCCR/DCCM channels, or use a single 64 kbps channels like E1/F1 (i.e. E1/F1 are order wire and user channels in SONET/SDH).

As an example, if TDM based HDLC controller is supporting 3 TDM buses and the number of slots supported is 64, the time slots remain 64 irrespective of the number of TDM buses used. All the 64 slots can be sent over single TDM bus or 2 buses or more number of TDM buses. Also, the method can operate one bus at 64 kbps time slot rate and get "x" no of 64 kbps channels.

One bus at DCCR rate (3× Rate) and get "y" DCCR channels

One bus at DCCM rate (9× Rate) and get "z" DCCM channels where x+y+z=64

Figure 2A:
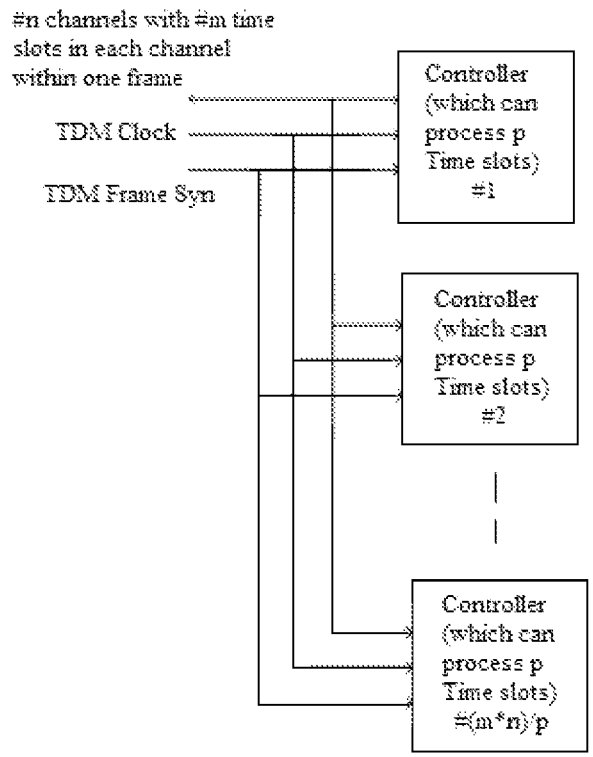
FIG. 2A illustrates the block diagram of Prior Art for mapping management channels into TDM slots.
Figure 2B:
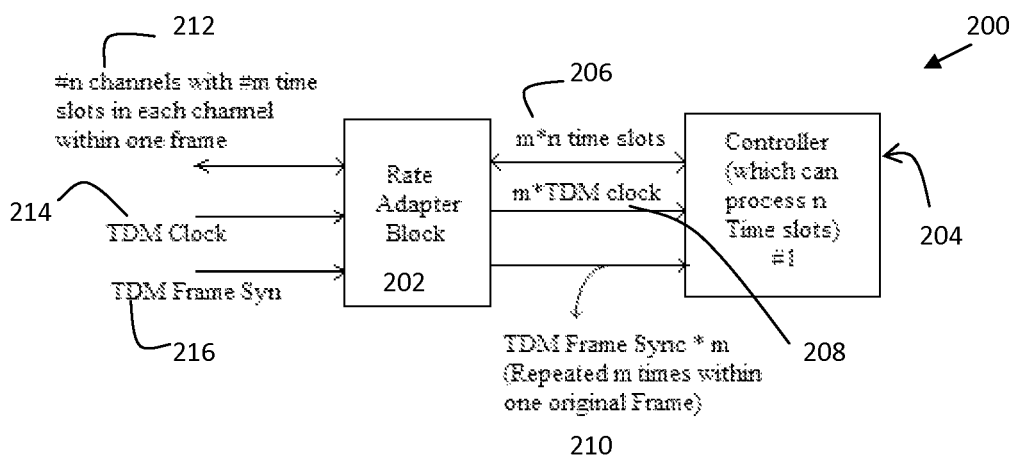
FIG. 2B illustrates the block diagram of mapping management channels into TDM slots and packing more number of management channels.

FIG. 2B illustrate the system block diagram 200 to enhance management channels in controllers. The management channels are DCCR/DCCM channels for SONET/SDH and GCC channels OTN. The basic blocks of the system are rate adapter block 202 and TDM based controller 204. The rate adapter block 202 generates all the required clock rates from a single input clock 214. The rate adapter block provides the required TDM clock rate 208 to the TDM based controller 204 which is based on the management channels in operation. The inputs to the rate adapter block are TDM clock frequency 214 and TDM frame sync 216. Also, another input is n channels with m time slots in each channel 212, where n is the number of management channels and m is number of time slots requires for each management channel. Based on the values of n and m the rate adapter block generates output clock frequency m times the TDM clock 208, which is the input clock for the TDM based controller. Also the rate adapter block provides the number of time slots requires i.e. the m*n 206 based on the inputs n channels with m time slots in each channel 212. The TDM frame sync signal 210 is repeated m times within one frame for the TDM based controller.

TDM based controller is selected from a group comprising of TDM based HDLC controllers, TDM based PPPoE controllers, and TDM based packet controllers. The management channels are DCCR/DCCM channels for SONET/SDH and GCC channels for OTN. Based on the input clock frequency to the controller, the packing of management channels in the TDM based controller are increased or enhanced i.e. by 3 times for DCCR, 9 times for DCCM, 2 times for GCC0, GCC1 and GCC2 and 4 times for the combination of GCC1 and GCC2. Using the method described in this disclosure the hardware of the system is reduced as well as the cost, which can be clearly seen by comparing the figures of prior art i.e. FIG. 2A and instant disclosure FIG. 2B.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and devices within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

In addition, where features or aspects of the disclosure are described in terms of Markush groups, those skilled in the art will recognize that the disclosure is also thereby described in terms of any individual member or subgroup of members of the Markush group.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

ACRONYMS

| Acronyms | Description |
| --- | --- |
| DCCR/DCCM | Data Communication Channel Regenerator/Data Communication Channel Multiplex |
| HDLC | High-level Data Link Control |
| TDM | Time Division Multiplex |
| SONET | Synchronous Optical Network |
| SDH | Synchronous Digital Hierarchy |
| OTN | Optical Transport Network |
| GCC | General Communication Channel |
| PPPoE | Point to Point Protocol over Ethernet |

The invention claimed is:

1. A method of enhancing management channels comprising:
    receiving, by a rate adapter block, data from predefined number of channels and a Time Division Multiplex (TDM) clock signal;
    operating, by the rate adapter block, the TDM clock signal frequency at a predefined frequency rate higher than operating frequency based on available management channels;
    transmitting, by a TDM controller, a predefined number of bytes of the data from each of the predefined number of channels on the management channels at the predefined frequency rate, upon receiving each clock sync signal by the rate adapter block,
    wherein the management channels are at least one of DCCR (Data Communication Channel Regenerator) channels for SDH (Synchronous Digital Hierarchy), DCCM (Data Communication Channel Multiplex) channels for SDH, Section (or Line) Data communication channels for SONET (Synchronous Optical Network) and GCC (General Communication Channel) channels for OTN (Optical Transport Network).

2. The method as claimed in claim 1, wherein each of the predefined number of channels is divided into a predefined number of time slots.

3. The method as claimed in claim 2, wherein the TDM slots use at least one TDM bus to send the data on to the management channels.

4. The method as claimed in claim 1, wherein the predefined frequency rate at which the TDM clock frequency is operated is 3 times the operating frequency for DCCR; 9 times the operating frequency for DCCM; 2 times the operating frequency for GCC channels GCC0, GCC1 and GCC2; and 4 times the operating frequency for combination of GCC channels GCC1 and GCC2.

5. The method as claimed in claim 1, wherein the management channels are processed by the TDM controllers selected from a group comprising of TDM based HDLC controllers, TDM based PPPoE controllers, and TDM based packet controllers.

6. A system to enhance management channels comprising:
    a rate adapter block to:
        receive data from predefined number of channels and a Time Division Multiplex (TDM) clock signal; and
        operate the TDM clock signal frequency at a predefined frequency rate higher than operating frequency based on available management channels; and
    a TDM controller to:
        transmit predefined number of bytes of the data from each of the predefined number of channels on management channels at the predefined frequency rate, upon receiving each clock sync signal by the rate adapter block, wherein the management channels are at least one of DCCR (Data Communication Channel Regenerator) channels for SDH (Synchronous Digital Hierarchy), DCCM (Data Communication Channel Multiplex) channels for SDH, Section (or Line) Data communication channels for SONET (Synchronous Optical Network) and GCC (General Communication Channel) channels for OTN (Optical Transport Network).

7. The system as claimed in claim 6, wherein the management channels are processed by the TDM controllers selected from a group comprising of TDM based HDLC controllers, TDM based PPPoE controllers, and TDM based packet controllers.

8. The system as claimed in claim 6, wherein the rate adapter block generates predefined frequency rate at which the TDM clock frequency is operated which is, 3 times the operating frequency for DCCR; 9 times the operating frequency for DCCM; 2 times the operating frequency for GCC channels GCC0, GCC1 and GCC2; and 4 times the operating frequency for combination of GCC channels GCC1 and GCC2.

9. The system as claimed in claim 6, wherein each of the predefined number of channels is divided into predefined number of time slots.

10. The system as claimed in claim 9, wherein the TDM slots use at least one TDM bus to send the data on to the management channels.

* * * * *